(12) United States Patent
Duncan

(10) Patent No.: US 11,132,318 B2
(45) Date of Patent: *Sep. 28, 2021

(54) DYNAMIC ALLOCATION OF RESOURCES OF A STORAGE SYSTEM UTILIZING SINGLE ROOT INPUT/OUTPUT VIRTUALIZATION

(71) Applicant: Micron Technology, Inc., Boise, ID (US)

(72) Inventor: Kevin R. Duncan, Ramsey, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/996,553

(22) Filed: Aug. 18, 2020

(65) Prior Publication Data

US 2020/0379935 A1    Dec. 3, 2020

Related U.S. Application Data

(63) Continuation of application No. 16/693,792, filed on Nov. 25, 2019, now Pat. No. 10,776,300, which is a continuation of application No. 15/905,172, filed on Feb. 26, 2018, now Pat. No. 10,509,753.

(51) Int. Cl.
*G06F 9/455* (2018.01)
*G06F 13/40* (2006.01)
*G06F 13/42* (2006.01)
*G06F 13/24* (2006.01)

(52) U.S. Cl.
CPC ...... *G06F 13/4004* (2013.01); *G06F 9/45558* (2013.01); *G06F 13/24* (2013.01); *G06F 13/4282* (2013.01); *G06F 9/455* (2013.01); *G06F 2009/45579* (2013.01); *G06F 2213/0026* (2013.01)

(58) Field of Classification Search
CPC .......................... G06F 2213/0026; G06F 9/455
See application file for complete search history.

(56) References Cited

U.S. PATENT DOCUMENTS

| | | | |
|---|---|---|---|
| 8,495,252 B2 | 7/2013 | Lais et al. | |
| 8,589,723 B2 | 11/2013 | Kumar et al. | |
| 8,707,090 B2 | 4/2014 | Akutsu | |
| 8,892,962 B2 | 11/2014 | Iwanaga | |
| 9,047,208 B1 | 6/2015 | Moore | |
| 9,317,317 B2 | 4/2016 | Graham et al. | |
| 9,459,908 B2 | 10/2016 | Anand et al. | |
| 10,509,753 B2 | 12/2019 | Duncan | |
| 10,776,300 B2 * | 9/2020 | Duncan ............... | G06F 9/45558 |

(Continued)

FOREIGN PATENT DOCUMENTS

WO    2014015409    1/2014

*Primary Examiner* — Zachary K Huson
(74) *Attorney, Agent, or Firm* — Brooks, Cameron & Huebsch, PLLC

(57) ABSTRACT

A peripheral component interconnect express (PCIe) physical function is coupled to a controller. The controller is configured to allocate a first portion of resources for use by the PCIe physical function. A PCIe virtual function is coupled to the controller. The is configured to allocate a second portion of resources for use by the PCIe virtual function based, at least in part, on a total number of PCIe physical functions and a total number of PCIe virtual functions associated with the apparatus.

20 Claims, 5 Drawing Sheets

(56) References Cited

U.S. PATENT DOCUMENTS

2015/0371684 A1  12/2015  Mataya
2016/0034415 A1   2/2016  Singh
2016/0203027 A1   7/2016  Challa
2017/0177528 A1   6/2017  Harriman

* cited by examiner

DYNAMIC ALLOCATION OF RESOURCES OF A STORAGE SYSTEM UTILIZING SINGLE ROOT INPUT/OUTPUT VIRTUALIZATION

PRIORITY INFORMATION

This application is a Continuation of U.S. application Ser. No. 16/693,792, filed on Nov. 25, 2019, which is a Continuation of U.S. application Ser. No. 15/905,172, filed on Feb. 26, 2018, issued U.S. Pat. No. 10,509,753 on Dec. 17, 2019, the contents of which are incorporated herein by reference.

TECHNICAL FIELD

The present disclosure relates generally to semiconductor devices, and, more particularly, to methods and apparatuses associated with physical and virtual functions.

BACKGROUND

A storage device may include one or more memory components that store data. For example, a solid-state drive (SSD) may include memory devices such as non-volatile memory devices. The storage device may further include a storage device controller that may manage each of the memory devices and allocate data to be stored at the memory devices. A host system may utilize the storage device, and write data to and/or request data from the storage device. The storage device controller may be used to retrieve data from the corresponding memory devices and return the retrieved data to the host system.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
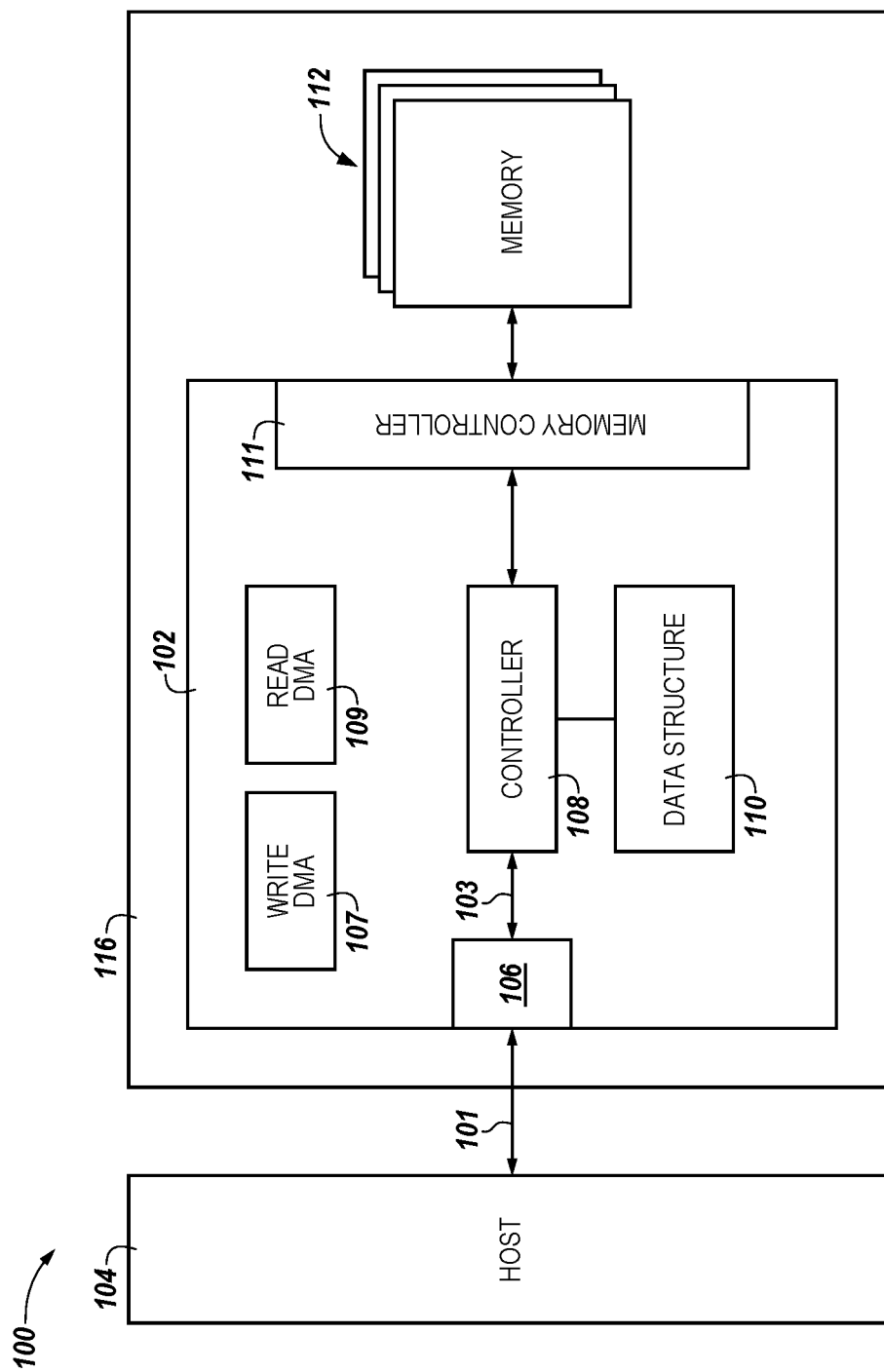
FIG. 1 is a block diagram of an apparatus in the form of a computing system including at least one SSD, in accordance with a number of embodiments of the present disclosure.

Aspects of the present disclosure are directed to physical and virtual functions of a storage system. An example of a storage system is a solid-state device (SSD). An SSD can include multiple interface connections to one or more host systems (hereinafter referred to as hosts). The interface connections can be referred to as ports. A host can send data commands (e.g., read, write, erase, program, etc.) to the SSD via a port. The ports can be physical and/or virtual ports ((which may be referred to as physical functions and virtual functions, respectively). For example, a physical port may include a physical connection (e.g., a physical path such as a peripheral component interconnect express (PCIe) path) and a virtual port may include a virtual connection (e.g., a logical path such as a PCIe virtual function).

The virtual functions may be provided as part of a single-root input/output virtualization (SR-IOV) environment. For example, the physical port may be a PCIe physical port, which may be shared in a virtualized environment to allow for a plurality of virtual functions to access the SSD. Furthermore, in some embodiments, the SSD may be configured to operate according to the SR-IOV specification defined in accordance with the peripheral component interconnect special interest group (PCI-SIG).

Operating a SSD in accordance with the SR-IOV specification (e.g., providing one or more virtual ports and/or functions in addition to a physical port and/or physical function) may allow for resources (e.g., memory resources, command slots, submission queues, completion queues, interrupt vectors, etc.) associated with the SSD to be distributed for use among multiple hosts. However, in some approaches, the distribution of resources amongst a plurality of physical and virtual hosts in a SR-IOV SSD deployment may fail to optimize the distribution of resources amongst the hosts.

For example, in some approaches, a fixed number of virtual functions (in addition to one physical function) may be allocated to access the SSD, which may lead to situations in which the memory resources are either under provisioned or over provisioned. As an example, if a fixed number of virtual functions are allocated to access the SSD, additional virtual functions may not be provided in the event that it is determined that it is beneficial to allow access to the SSD by more hosts than the fixed number of virtual functions allows for, which may limit scalability of the SSD.

For example, in some approaches, a SSD may be configured to support 128 virtual functions, which may appear as independent channels to a memory (e.g., a storage volume) of a SSD. However, if less than 128 virtual functions are deployed on the SSD, resources of the SSD may be unused thereby limiting the efficiency of the SSD.

In other approaches, allocating a fixed number of virtual functions to access the SSD may fail to make use of all the resources available in the SSD if less virtual functions than the fixed number of virtual functions are allocated. For example, if there are not enough hosts coupled to the SSD to make use of all of the fixed number of virtual functions, there may be portions of the memory that are not in use, which may lead to resources that could potentially be used not being used. This may be problematic due to the fact that such resources (e.g., hardware resources, memory resources, command slots, submission queues, completion queues, interrupt vectors, etc.) are, in practice, limited.

Aspects of the present disclosure address the above and other deficiencies by dynamically allocating resources utilized by virtual functions in a SDD. For example, a number of virtual functions to be allocated to the SSD may be determined when the SSD is initialized. For example, on initialization of the SSD, a number of virtual functions desired may be allocated to the SSD. Should the number of virtual functions desired change, the SSD may be reset with an updated number of virtual functions allocated thereto. This may allow for the resources utilized by virtual functions to be redistributed based on the number of desired virtual functions. For example, resources allocated to the virtual functions may be redistributed if there are fewer virtual functions desired than a maximum number of virtual functions supported by the SSD.

In addition, as described further herein, in some embodiments, a SSD may be configured to have a plurality of virtual functions and at least one physical function (e.g., an admin physical function). The virtual functions and the physical function may each have command and/or data processing resources allocated thereto. In some embodiments, such as Non-Volatile Memory Express (NVMe) implementations, the virtual functions and the physical function may each have a plurality of submission queues and completion queues allocated thereto, and the virtual functions and the physical function may each have a number of command slots (e.g., slots in a data structure associated with the memory device) allocated thereto.

By abstracting the resources available to the SSD, resources associated with a controller (e.g., queue management and command management) may be redistributed among a desired number of virtual functions. In some embodiments, this may allow for optimization of distribution of the SSD resources, which may allow for potentially wasted SSD resources to be utilized.

FIG. 1 is a block diagram of an apparatus in the form of a computing system 100 that includes a storage device, in accordance with one or more embodiments of the present disclosure. An example of a storage device 116 is an SSD. The computing system 100 can include one or more host systems (e.g., host 104, which may include one or more host systems). One or more hosts are also hereinafter referred to as host 104. The host 104 can be a computing device such as a desktop computer, laptop computer, network server, mobile device, or such computing device that includes a memory and a processing device. The host 104 can include or be coupled to the storage device 116. The host 104 can write data to the storage device 116 and/or read data from the storage device 116. As used herein, host 104, memory 112, SSD 116, write DMA 107, controller 108, read DMA 109, data structure 110, memory controller 111, and/or port 106 might also be separately considered an "apparatus."

Computing system 100 includes a SSD 116 (e.g., a SSD) communicatively coupled to host 104. A port 106 of the SSD 116 can communicatively couple the SSD 116 to the host 104 via communication link 101 (e.g., a cable, bus, etc.), which may be referred to herein as a "command path." As used herein, a "port" may be a physical port (e.g., a port configured to send and/or receive data via a physical function) or a virtual port (e.g., a port configured to send and/or receive data via a virtual function).

FIG. 1 illustrates various components of a solid state drive 116, including a system controller 102, a port 106 (e.g., a number of ports), and a memory 112 (e.g., a number of memory devices 112), which can serve as a storage volume for the system 100. In some embodiments the memory devices 112 can be coupled to the system controller 102 via one or more number of channels.

The storage device 116 can include memory device(s) 112. In some embodiments, the memory device(s) 112 may be based on non-volatile memory. For example, the memory devices 112 may be a negative-and (NAND) type flash memory. Each of the memory devices 112 may include one or more arrays of memory cells such as single level cells (SLCs), multi-level cells (MLCs), or quad-level cells (QLCs). Each of the memory cells may store bits of data (e.g., data blocks) used by the host system 104. Although non-volatile memory devices such as NAND type flash memory are described, the memory devices 112 may be based on any other type of memory. For example, the memory devices 112 may be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, and electrically erasable programmable read-only memory (EEPROM). Furthermore, the memory cells of the memory devices 112 may be grouped as memory pages or data blocks that may refer to a unit of the memory device used to store data.

The host 104 can be coupled to the storage device 116 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface may be used to transmit data between the host system 104 and the storage device 110. The host system 104 may further utilize an NVM Express (NVMe) interface protocol to access the memory devices 112 when the storage device 116 is coupled with the host system 104 by the PCIe interface.

The storage device 116 can be capable of pipelined command execution in which multiple commands are executed, in parallel, on the storage device 116. The storage device 116 can have multiple command paths (hereinafter referred to as paths) to the memory devices 112. For example, the storage device 116 may be a multi-channel storage device that may have multiple physical PCI Express (PCIe) paths to the memory devices 112. In another example, the SSD 116 may use single root input/output virtualization (SR-IOV) with multiple virtual functions (VFs) that act as multiple logical paths to the memory devices 112.

SR-IOV is a specification that enables the efficient sharing of PCIe devices among virtual machines. A single physical PCIe can be shared on a virtual environment using the SR-IOV specification. The storage device 116 can be a PCIe device that is SR-IOV-enabled and can appear as multiple, separate physical devices, each with its own PCIe configuration space. With SR-IOV, a single I/O resource, which is known as a physical function, can be shared by many virtual machines. An SR-IOV virtual function is a PCI function that is associated with an SR-IOV physical function. A virtual function is a lightweight PCIe function that shares one or more physical resources with the physical function and with virtual functions that are associated with that physical function. Each SR-IOV device can have a physical function and each physical function can have one or more virtual functions associated with it. The virtual functions are created by the physical function.

The communication link 101 may comprise a plurality of links used to communicate information between SSD 116 and a number of hosts such as host 104. The host(s) 104 may be configured to send and/or receive commands and/or data to the SSD 116, or the SSD 116 may be configured to process commands and/or data received from the host 104 and/or send the processed commands and/or data back to the host 104. The computing system 100 can be, for example, a laptop computer, a personal computer, digital camera, digital recording and/or playback device, mobile telephone (e.g., a smartphone), memory card reader, tablet, phablet, personal digital assistant, interface hub, sensors, Internet-of-Things (IoT) enabled device, among other computing devices.

The host 104 can include a number of processing resources (e.g., one or more processors) capable of accessing system 116. As an example, host 104 may itself be a computing device capable of accessing system 116 via a communication link 101. According to one or more embodiments, SSD 116 can be configured as an external, or portable, SSD for computing system 100 (e.g., with plug-in connectivity). Although shown as a single component in FIG. 1, as described in more detail in association with FIGS. 2 and 3, herein, embodiments are not limited to environments having a single component controller.

The system controller 102 can communicate with the memory device 112 to operate (e.g., read, write, erase, etc.) the memory 112. The system controller 102 can be used to manage communications with, and the data stored in, the memory device 112. System controller 102 can be implemented in the form of hardware, firmware, and/or software. For example, system controller 102 can comprise a number of discrete circuitry components.

The communication protocol between the host 104 and the SSD 116 may be different than what is required for accessing a memory device (e.g., memory 112). System controller 102 can include control circuitry configured to translate commands received from the host 104 into appropriate commands to accomplish the intended operation of the memory 112. The system controller 102 can provide a translation layer between the host 104 and the SSD 116. System controller 102 can also process host command sequences, the associated data, and other information (e.g., signals) to appropriate channel command sequences, for example, to store and retrieve data. System controller 102 can selectively distribute commands, communicate (e.g., receive, send, transmit) associated data, and other information, through an appropriate channel to a corresponding memory device of memory 112.

In some embodiments, the system controller 102 (or a portion thereof) may be provided as a system on a chip. For example, the system controller 102 may be provided as part of an application specific integrated circuit (ASIC), or as part of a field-programmable-gate-array (FPGA), or other suitable system on a chip. The system controller 102 includes a controller 108, which is communicatively coupled to port 106 and data structure 110. As used herein, a "data structure" refers to a specialized format for organizing and/or storing data, which may or may not be organized in rows and columns. Examples of data structures include arrays, files, records, tables, trees, etc.

Controller 108 may be configured to control operation of the system controller 102. For example, the controller 108 may be configured to control movement of commands and/or data between the host 104 and the memory controller 111. For instance, the controller 108 may be configured to process commands transferred between the host 104 and the memory 112 via memory controller 111. In some embodiments, controller 108 may be a non-volatile memory express (NVMe) controller. For example, the controller 108 may be configured to operate in accordance with a logical device interface specification (e.g., protocol) such as the NVMe specification or a non-volatile memory host controller interface specification. Accordingly, in some embodiments, the controller 108 may be configured to process commands and/or data according to the NVMe protocol.

The controller 108 may be coupled to the port 106 via command path 103. Command path 103 may be a physical path (e.g., a wire or wires) that may be configured to pass physical functions and/or virtual functions between the port 106 and the controller 108 in accordance with the NVMe standard. For example, in a single root input/output virtualization (SR-IOV) deployment, which is described in more detail in association with FIGS. 2 and 3, controller 108 can serve as multiple controllers (e.g., NVMe controllers) for respective physical functions and/or each virtual functions, such that controller 108 provides multiple controller operations.

The system controller 102 may further include direct memory access (DMA) components that can allow for the system controller 102 to access main memory of the computing system 100 (e.g., DRAM, SRAM, etc. of host 104). For example, write DMA 107 and read DMA 109 may facilitate transfer of information between the host 104 and the memory 112. In at least one embodiment, write DMA 107 may facilitate reading of data from the host 104 and writing of data to the memory 112. The read DMA 109 may facilitate reading of data to the memory 112 and writing of data to the host 104. In some embodiments, write DMA 107 and/or read DMA 109 may be configured to read and write data via a PCIe connection.

The system controller 102 includes a memory controller 111 coupled to the controller 108. The memory controller 111 may be configured to control operation of the memory 112. In some embodiments, the memory controller 111 may be a flash memory controller such as a NAND flash controller, or other suitable controller.

Figure 4:
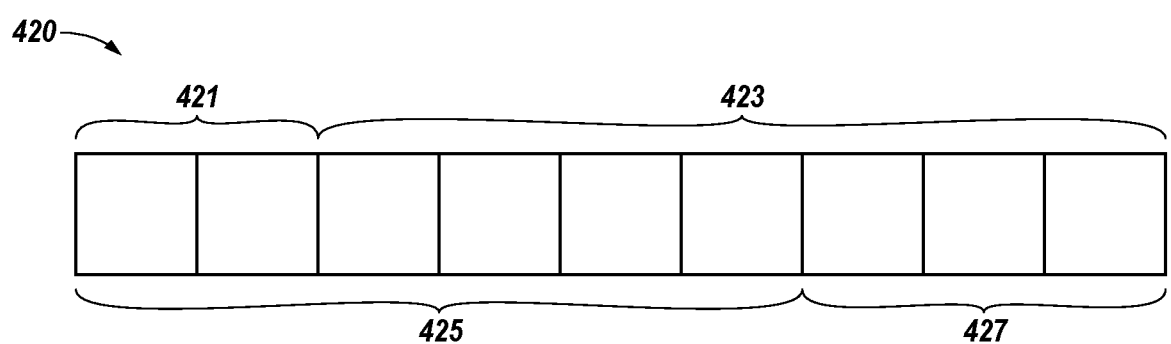
FIG. 4 is an example of a command in accordance with a number of embodiments of the present disclosure.

As described in more detail in association with FIG. 4, herein, in some embodiments, the controller 108 may be configured to assign identification information (e.g., a virtual function number, a queue number, a port number, etc.) to the port 106. In some embodiments, the identification information may be referred to herein as a command identifier. The command identifier may, in turn, be assigned (e.g., appended) to commands received from the host 104. For example, a virtual function number (e.g., a number identifying particular virtual port) and/or a queue number (e.g., a number corresponding to the command's position in a submission queue or completion queue) associated with the host 104 or port 106 may be appended to commands generated by the host 104.

Figure 2:
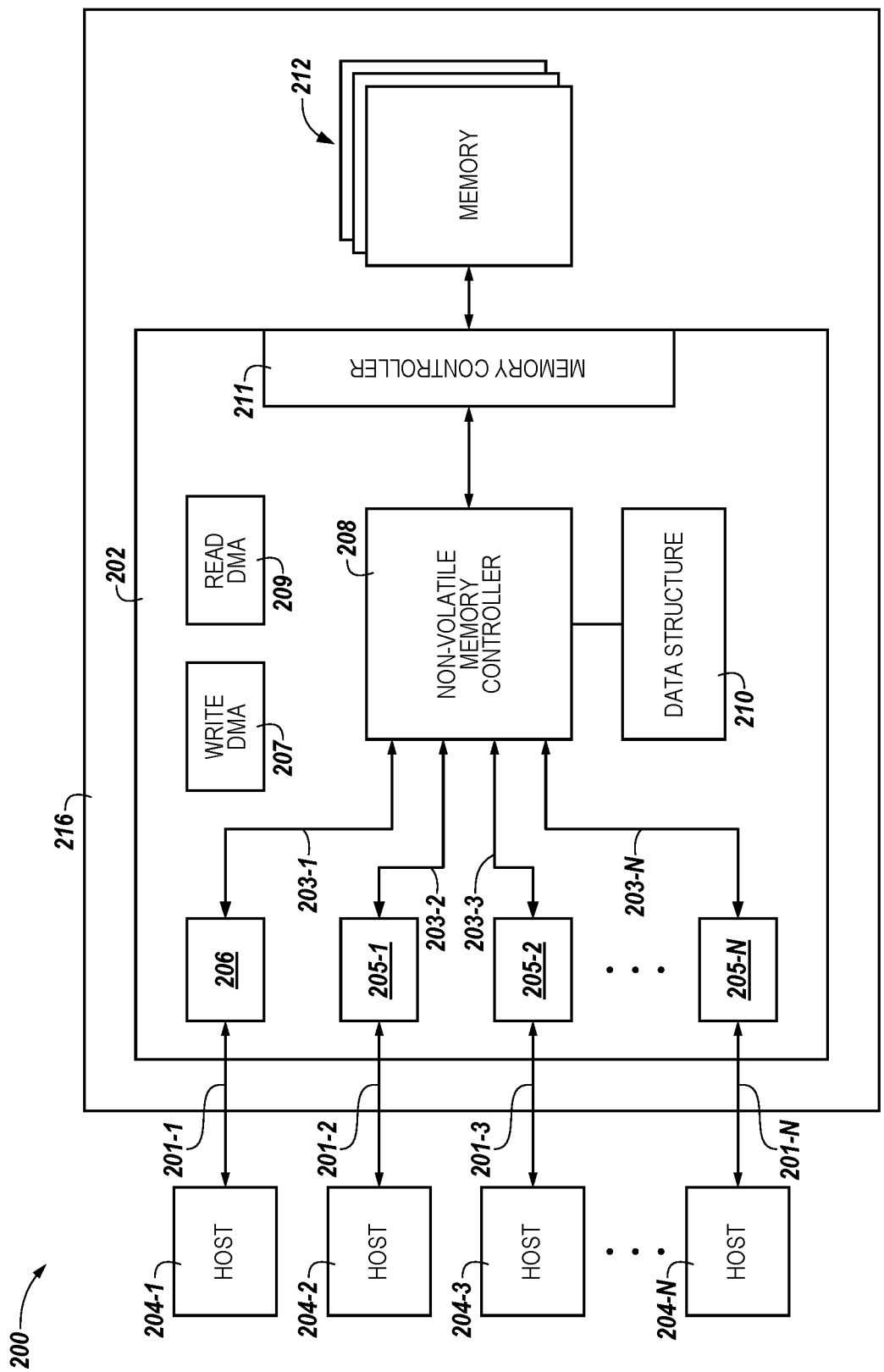
FIG. 2 is a block diagram of an apparatus in the form of a computing system including a plurality of hosts coupled to a system controller in accordance with a number of embodiments of the present disclosure.

FIG. 2 is a block diagram of a computing system 200 including a plurality of hosts 204-1, . . . , 204-N coupled to a system controller 202 in accordance with a number of embodiments of the present disclosure. As shown in FIG. 2, a plurality of hosts 204-1, . . . , 204-N may be coupled via respective communication links 201-1, . . . , 201-N to respective ports 206, 205-1, . . . , 205-N of the SSD 216. In some embodiments, physical host 204-1 may be a host admin device, while the remaining hosts 204-2, . . . , 204-N may be user hosts. As used herein, a "host admin device" is a host computing device that has elevated access to resources of the SSD 216 as compared to access provided to a user host. For example, the host admin device (e.g., physical host 204-1) may be configured such that the host admin device can issue commands that are part of admin command set. In contrast, the remaining hosts 204-2, . . . , 204-N may be configured such that the remaining hosts 204-2, . . . , 204-N are not able to issue commands that are part of the admin command set.

In some embodiments, port 206 may be a physical port configured to transfer data via a physical function (e.g., a PCIe physical function), while ports 205-1, . . . , 205-N may be virtual ports configured to transfer data via a virtual function (e.g., a PCIe virtual function). For example, in some embodiments, the SSD 216 may be configured to support multiple connections to, for example, allow for multiple hosts 204-1, . . . , 204-N to be connected to the SSD 216.

In some embodiments, the computing system 200 may be deployed in environments in which one or more hosts 204-1, . . . , 204-N are located in geophysically disparate locations, such as in a software defined data center (e.g., a distributed computing system) deployment. For example, host 204-1 may be in one physical location (e.g., in a first geophysical region), host 204-N may be in a second physical location, and/or SSD 216 may be in a third physical location. In such examples, one or more of the hosts 204-1, . . . , 204-N may be virtual machines (e.g., an isolated user space instance executed within a virtualized environment) or containers (e.g., containers that run within Linux in the absence of a hypervisor).

In some embodiments, the computing system 200 may be configured to support single root input/output virtualization (SR-IOV) via one or more ports 206-1, . . . , 206-N. For example, the computing system 200 may be configured to operate according to a virtualization specification in which PCIe resources may be isolated for management and/or performance reasons. In such a deployment, a single physical PCIe function can be virtualized to support multiple virtual components (e.g., virtual ports such as virtual ports 205-1, . . . , 205-N) that may send and/or receive data via respective virtual functions.

As shown in FIG. 2, port 206-1 is coupled to a controller 208 via a first command path 203-1, and ports 205-1, . . . , 205-N are coupled to the controller 208 via respective command paths 203-2, . . . , 203-N. Accordingly, in some embodiments, the SSD 216 may include multiple physical paths and/or multiple virtual functions that are configured to provide access to a same storage medium (e.g., memory 212) of the computing system 200. In some embodiments, physical port 206 and/or the virtual ports 205-1, . . . , 205-N may be peripheral component interconnect express (PCIe) ports.

Figure 3:
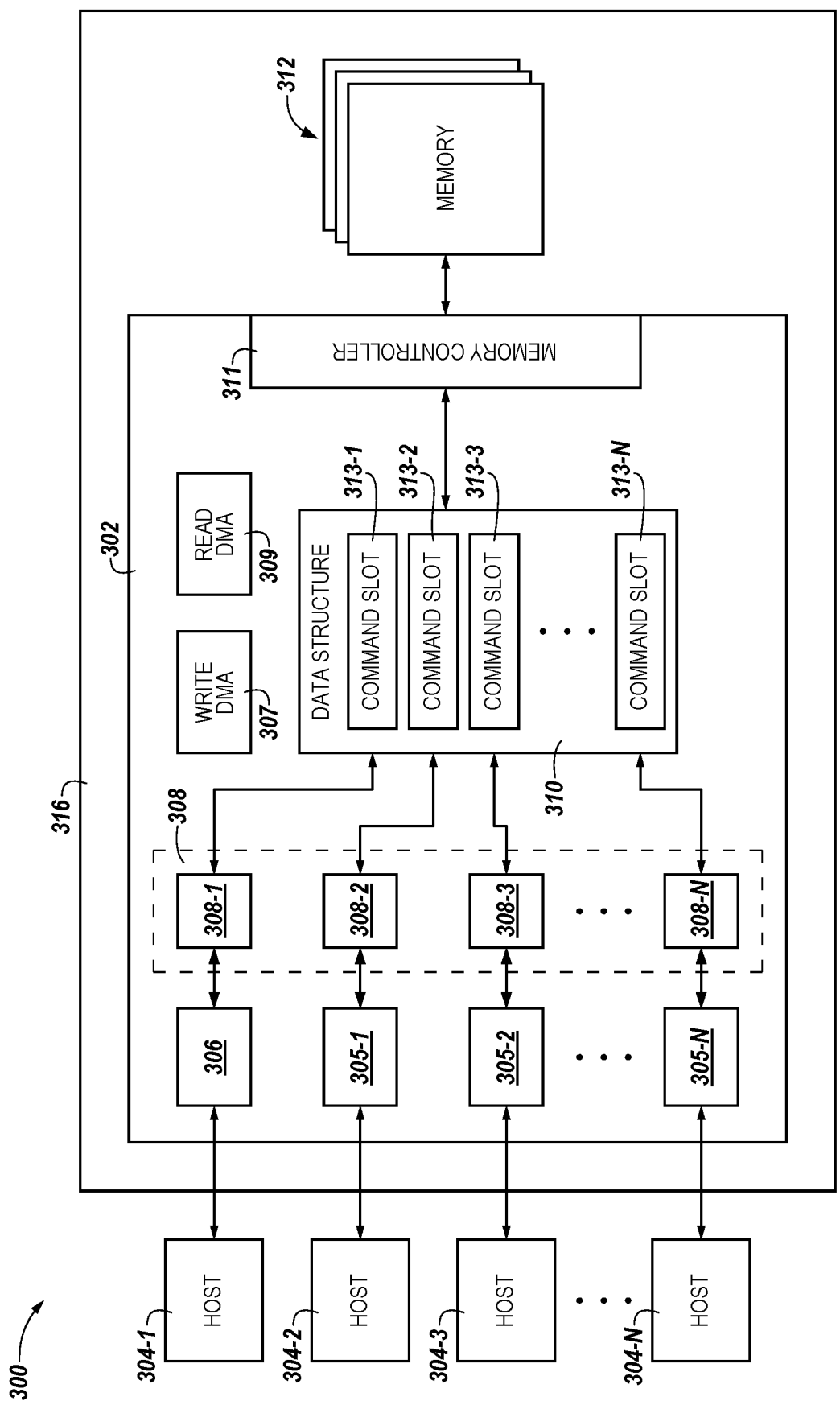
FIG. 3 is another block diagram of an apparatus in the form of a computing system including a plurality of hosts coupled to a system controller in accordance with a number of embodiments of the present disclosure.

Although shown as a single controller in FIG. 2, embodiments are not so limited, and the controller 208 may comprise multiple sub-controllers and/or multiple controllers, as described in more detail in association with FIG. 3, herein. For example, each respective port 206, 205-1, . . . , 205-N may have a separate sub-controller, sub-block controller portion, or controller coupled thereto.

In some embodiments, the controller 208 may be configured to allocate a plurality of virtual functions and a physical function (e.g., an admin physical function) to the SSD 116. For example, the controller 208 may be configured to assign resources (e.g., processing resources, controller resources, etc.) associated with the controller 208 based on the number of functions (the number of physical functions and the number of virtual functions) desired. The number of functions desired may be determined via a user input (e.g., the number of desired functions may be programmed), a total amount of resources available to the SSD 116, a total number of functions coupled to the controller 208 and/or SSD 116, or other suitable methods or inputs. For example, if the SSD 216 is configured to support two hosts (e.g., one physical host 204-1 and virtual host 204-2), the resources associated with the controller 208 may be allocated such that half of the resources are available to the physical host 204-1 and half of the resources are available to the virtual host 204-2. Embodiments are not so limited; however, and the resources associated with the controller 208 may be allocated such that a percentage of the total amount of controller resources are allocated to the physical host 204-1 and a percentage of the total amount of controller resources are allocated to the virtual host 204-2 may be determined via a user input (e.g., the number of desired functions may be programmed), a total amount of resources available to the SSD 116, a total number of functions coupled to the controller 208 and/or SSD 116, or other suitable methods or inputs. The percentage of resources allocated to the physical host 204-1 and the virtual host 204-2. For example, 70% of the controller resources may be allocated to the physical host 204-1, and the remaining 30% of the controller resources may be allocated to the virtual host 204-2. In at least one embodiment, the controller resources may be divided by the sum of the number of requested physical functions and virtual functions in quantities of a power of two.

The controller 208 may also be configured to assign a plurality of submission queues and completion queues to each virtual function and the physical function. In some embodiments, the submission and completion queues may be paired such that each virtual function and the physical function are assigned a plurality of pairs of submission and completion queues. In addition, the controller 208 may be configured to assign a number of command slots (e.g., space in the data structure 210) to each virtual function and the physical function, as described in more detail in association with FIG. 3, herein.

In some embodiments, the submission queue/completion queue pairs may be NVMe submission queue/completion queue pairs. For example, commands generated by the physical host 204-1 may be sent to the submission queue prior to processing by the SSD 216. Commands that have been processed (e.g., commands that have been completed) may be sent to the completion queue. In some embodiments, multiple submission queues may share the same completion queue; however, in some embodiments of the present disclosure, the submission queues and completion queues may be paired such that there is 1:1 correspondence between the submission queues and the completion queues.

In some embodiments, instructions stored on the hosts 204-1, . . . , 204-N may be executed to generate the submission queues and the completion queues. The number of submission/completion queues generated may be based on the configuration of the computing system 200 and/or an anticipated workload for the computing system 200. The submission/completion queues may be allocated in memory associated with the respective hosts 204-1, . . . , 204-N. For example, submission queues and completion queues associated with the host 204-1 may be allocated in memory associated with the host 204-1. Similarly, submission queues and completion queues associated with the host 204-N may be allocated in memory associated with the host 204-N.

FIG. 3 is another block diagram of a computing system 300 including a plurality of hosts 304-1, . . . , 304-N coupled to a system controller 302 in accordance with a number of embodiments of the present disclosure. In FIG. 3, the controller 308 is illustrated as including a plurality of sub-controllers 308-1, . . . , 308-N. The sub-controllers may be discrete components, or the sub-controllers 308-1, . . . , 308-N may correspond to partitions within a single controller 308. For example, the controller 308 may include a plurality of sub-block portions 308-1, . . . , 308-N that are configured to operate independently. In some embodiments, each sub-block portion 308-1, . . . , 308-N of the controller 308 may be configured to operate as queue management blocks for each respective physical function and/or virtual function allocated to the SSD 316.

For example, there may be as many sub-block portions 308-1, . . . , 308-N of the controller 308 as desired based on the number of desired physical and virtual functions. In one non-limiting example, there may be 64 sub block portions 308-1, . . . , 308-N of the controller 308. In this example, one physical function and 63 virtual functions could be supported by the SSD 316. That is, in this example, there may be 64 sub-block portions 308-1, . . . , 308-N of the controller 308, with each respective sub-block portion corresponding to a respective physical function or a respective virtual function.

In this example, a first sub-block portion 308-1 of the controller 308 is configured to operate as a queue management block for the physical function associated with physical host (e.g., host admin device) 304-1, while the remaining 63 sub-block portions 308-2, . . . , 308-N (where N is 64) of the controller 308 are configured to operate as queue management blocks for respective virtual functions associated with the virtual hosts 304-2, . . . , 304-N. Embodiments are not so limited; however, and the controller 308 may be configured to allocate sub-blocks of the controller 308 based on the number of physical functions and virtual functions desired. For example, the controller 308 may be configured to allocate sub-blocks of the controller 308 based on the sum of the number of physical functions and virtual functions desired in quantities of powers of two. In some embodiments, if there are less than 64 total functions, the controller 308 may be configured such that sub-blocks of the controller 308 may be ganged to optimize the amount of resources available to each physical function and virtual function desired.

Continuing with this example, the controller 308 may be configured to allocate 8 pairs of submission and completion queues to each physical function and each virtual function. For example, the controller 308 may be configured to allocate 8 pairs of submission and completion queues to the physical function associated with the physical host 304-1 and allocate 8 pairs of submission and completion queues to each of the 63 virtual functions associated with hosts 304-2, . . . , 304-N. In some embodiments, each function (e.g., each physical function and each virtual function) may be configured to handle 32 commands at any given time; however, embodiments are not so limited, and each function may be configured to handle less than 32 commands or more than 32 commands at any given time.

As shown in FIG. 3, the computing system 300 includes a data structure 310. The data structure 310 may be coupled to controller 308 (or to sub-block portions 308-1, . . . , 308-N of controller 308). In some embodiments, the data structure 310 includes a plurality of command slots 313-1, . . . , 313-N. The command slots 313-1, . . . , 313-N may each comprise a number of storage locations (e.g., a number of memory locations to store commands) to service commands received from the hosts 304-1, . . . , 304-N.

The controller 308 may be configured to allocate a number of command slots 313-1, . . . , 313-N in the data structure 310 to each physical function and each virtual function of the computing system 300. For example, the controller 308 may be configured to allocate command slot 313-1 to commands received via physical port 306, while command slots 313-2, . . . , 313-N may be allocated to commands received via the virtual ports 305-1, . . . , 305-N.

In some embodiments, the number of command slots 313-1, . . . , 313-N allocated to each physical function and virtual function may be based on the number of physical functions and virtual functions desired. By allocating the command slots 305-1, . . . , 305-N to each physical function and virtual function based on the number of physical functions and virtual functions desired, resource usage of the computing system 300 may be optimized in some embodiments, because resources associated with all the command slots may be utilized in contrast to approaches in which a dedicated number of command slots are allocated to physical and virtual functions regardless of how many physical and virtual functions are desired.

FIG. 4 is an example of a command 420 in accordance with a number of embodiments of the present disclosure. The command 420 shown in FIG. 4 may be an example of a command 420 generated by a host coupled to a SSD such as SSD 316 illustrated in FIG. 3. The command 420 may be received by one of the ports (e.g., physical port 306 or virtual ports 305-1, . . . , 305-N illustrated in FIG. 3). In the example shown in FIG. 4, the command 420 includes 2-bits for logical functions 421 and 7-bits for logical queues 423. In addition, the command 420 may include 6-bits for physical functions 425 (e.g., physical NVMe functions) and 3-bits for physical queues 427.

The example command 420 illustrated in FIG. 4 may represent addressing associated with physical resources available if all the available resources are utilized by, for example, the SSD. In some embodiments, the number of physical functions 425 multiplied by the number of physical queues 427 may give the total amount of physical resources available to the SSD. The number of logical functions 421 multiplied by the number of logical queues 423 may represent the logical addressing for the SSD if a fraction (e.g., not all) of the virtual functions supported by the memory device and all of the physical resources available are utilized. For example, the number of physical functions 425 multiplied by the number of physical queues 427 may be equal to the number of logical functions 421 multiplied by the number of logical queues 423.

In some embodiments, the command 420 may be stored in a command slot of the data structure associated with the system controller (e.g., command slot 313-1, . . . , 313-N of data structure 310 illustrated in FIG. 3). For example, a command 420 generated by a host (e.g., host 304-1) may be stored in command slot (e.g., command slot 313-1) of the data structure (e.g., data structure 310).

In some embodiments, the command 420 may have identification information, such as a command identifier, assigned thereto. The identification information may include a virtual function number concatenated on top of a queue number (e.g., {virtual function number, queue number}). The virtual function number may be a number that corresponds to a particular virtual function among the plurality of virtual functions that may be utilized by the computing system.

In some embodiments, each physical function and virtual function may have a function number associated therewith. For example, the physical function may be assigned a function number of zero, a first virtual function may be assigned a function number of one, a second virtual function may be assigned a function number of two, etc. These function numbers may be used to allocate controller resources to each function (physical or virtual).

As an example, if the physical function is assigned a function number of zero, a first amount of resources of the controller may be allocated for use by the physical function based on the function number being zero, while a second amount of controller resources may be allocated for use by the virtual function having a function number of one assigned thereto. In some embodiments, the function numbers may be used to index entries in the data structure (e.g., to index to command slots in the data structure). The function numbers may, in some embodiments, be appended or concatenated on top of commands processed by their respective sub-block portions of the controller as a means of identifying commands associated with each physical function or virtual function. In some embodiments, the function number may be a portion of a command identifier.

Figure 5:
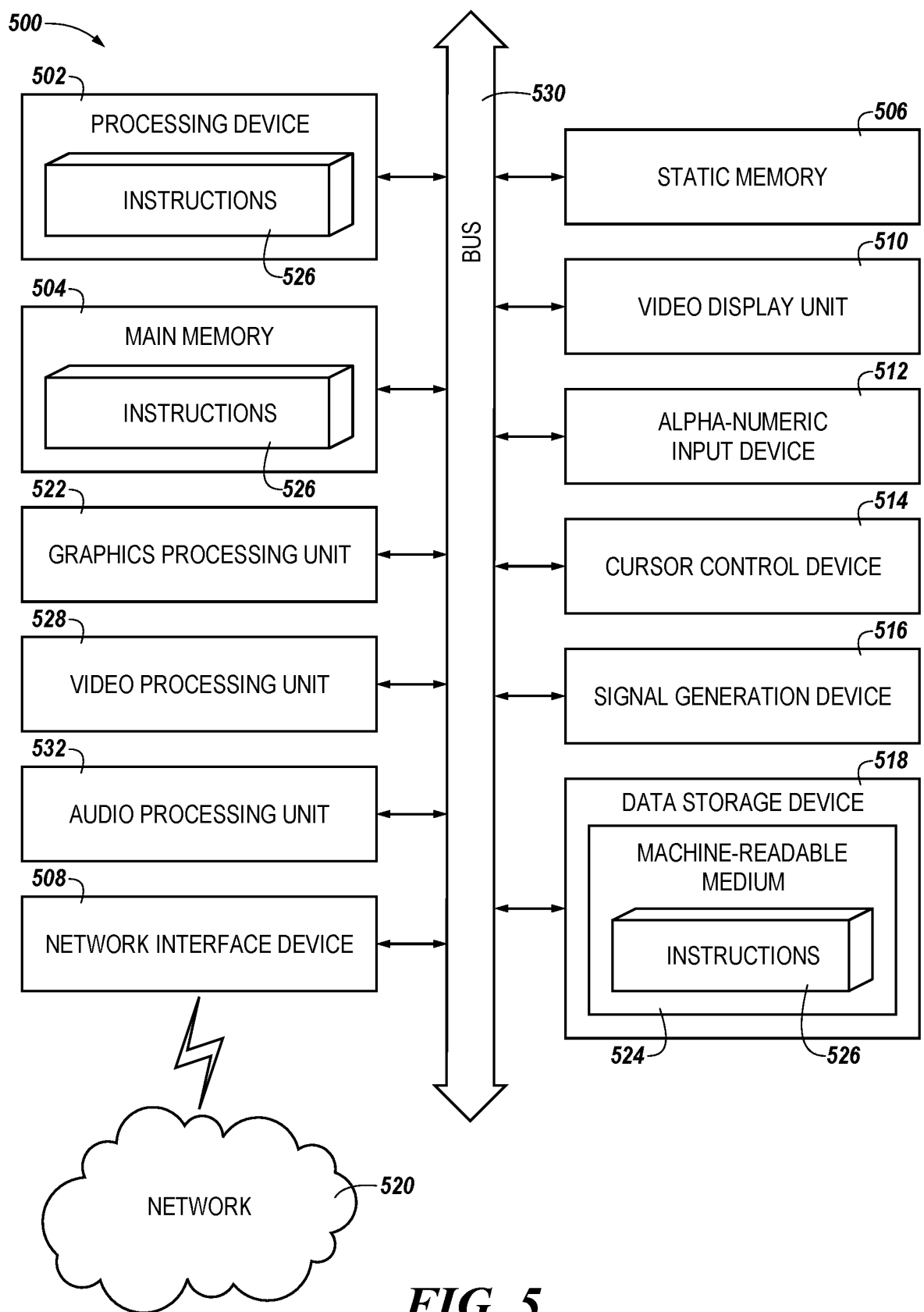
FIG. 5 is a block diagram of an example computer system in which implementations of the present disclosure may operate.

FIG. 5 illustrates an example machine of a computer system 500 within which a set of instructions, for causing the machine to perform any one or more of the methodologies discussed herein, may be executed. For example, the computer system 500 may include or utilize a storage device (e.g., storage device 116 of FIG. 1) or may be used to perform the operations of a controller (e.g., to execute an operating system to perform operations corresponding to the command processing component 113 of FIG. 1). In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein.

The computer system 500 may further include a network interface device 508 to communicate over the network 520. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), a graphics processing unit 522, a signal generation device 516 (e.g., a speaker), graphics processing unit 522, video processing unit 528, and audio processing unit 532.

The data storage device 518 may include a machine-readable storage medium 524 (also known as a computer-readable medium) on which is stored one or more sets of instructions or software 526 embodying any one or more of the methodologies or functions described herein. The instructions 526 may also reside, completely or at least partially, within the main memory 504 and/or within the processing device 502 during execution thereof by the computer system 500, the main memory 504 and the processing device 502 also constituting machine-readable storage media. The machine-readable storage medium 524, data storage device 518, and/or main memory 504 may correspond to the storage device 116 of FIG. 1.

In one implementation, the instructions 526 include instructions to implement functionality corresponding to a command processing component (e.g., command processing component 113 of FIG. 1). While the machine-readable storage medium 524 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving" or "associating" or "assigning" or "aborting" or "deleting" or "appending" or "identifying" or "comparing" or "determining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. An apparatus, comprising:
    a peripheral component interconnect express (PCIe) physical function; and
    a processing device coupled to the PCIe physical function, wherein the processing device is to:
        allocate a first quantity of PCIe virtual functions for use by the apparatus;
        allocate a command slot in a data structure accessible by the processing device for use by the PCIe physical function; and
        allocate a first different command slot in the data structure for use by one or more of the quantity of PCIe virtual functions.

2. The apparatus of claim 1, wherein the processing device is configured to:
    allocate a second quantity of PCIe virtual functions to use the second portion of resources; and
    allocate second respective command slots in the data structure for use by each PCIe virtual function of the second quantity of PCIe virtual functions such that each PCIe virtual function of the second quantity of PCIe virtual functions has a respective command slot associated therewith.

3. The apparatus of claim 1, wherein:
    the PCIe physical function is coupled to a first host computing device; and
    the PCIe virtual function is coupled to a second host computing device.

4. The apparatus of claim 1, wherein the processing device is further configured to assign a command identifier to a command received by the PCIe virtual function, the command identifier comprising information corresponding to the PCIe virtual function and information corresponding to a particular submission queue among the plurality of submission queues associated with the PCIe virtual function.

5. The apparatus of claim 1, wherein the processing device is further configured to assign a command identifier to a command received by the PCIe virtual function, the command identifier comprising information corresponding to the PCIe virtual function and information corresponding to a particular completion queue among the plurality of completion queues associated with the PCIe virtual function.

6. The apparatus of claim 1, wherein the processing device is further configured to assign a number of interrupt vectors to the PCIe physical function.

7. The apparatus of claim 1, wherein the processing device is further configured to assign a number of interrupt vectors to the PCIe virtual function.

8. A method, comprising:
    assigning a first number of command slots in a data structure to one or more PCIe virtual functions such that at least one PCIe virtual function of a first quantity of PCIe virtual functions has a respective command slot associated therewith;
    causing respective PCIe virtual functions to be redistributed such that a subset of the PCIe virtual functions are communicatively coupled to a processor; and
    assigning a second number of command slots in the data structure to at least one of the respective PCIe virtual functions among the subset of PCIe virtual functions.

9. The method of claim 8, wherein the PCIe virtual functions comprise logical command paths.

10. The method of claim 8, further comprising assigning a corresponding command identifier to a command received by the first quantity of PCIe virtual functions or the second quantity of PCIe virtual functions, or both.

11. The method of claim 8, further comprising assigning a number of submission queues and completion queues to the respective PCIe virtual functions.

12. The method of claim 8, further comprising allocating a particular amount of memory resources based, at least in part, on a total number of PCIe virtual functions.

13. The method of claim 8, further comprising assigning a command identifier to one or more of the PCIe virtual functions, wherein the command identifier comprises a number corresponding to the PCIe virtual function that receives the command concatenated on top of a number corresponding to a particular submission queue or a particular completion queue to which the command is associated.

14. A system, comprising:
    a peripheral component interconnect express (PCIe) physical function coupled to a processing device;
    a first quantity of PCIe virtual functions coupled to the processing device; and
    a data structure accessible to the processing device, wherein the processing device is configured to:

assign a first number of respective command slots in the data structure for use by each virtual function among the plurality of virtual functions;

redistribute the first quantity of PCIe virtual functions to yield a second quantity of PCIe virtual functions; and assign a second number of respective command slots in the data structure for use by each virtual function among the second quantity of virtual functions.

15. The system of claim 14, wherein the system is a system on a chip and wherein the processing device is configured to logically assign a number of sub-block portions of the processing device to the physical function and the virtual function based, at least in part, on a number of physical functions and a number of virtual functions associated with the system on a chip.

16. The system of claim 14, wherein the processing device is configured to allocate respective portions of resources to each virtual function among the first quantity of virtual functions.

17. The system of claim 14, wherein the processing device is configured to allocate respective portions of resources to each virtual function among the second quantity of virtual functions.

18. The system of claim 14, wherein the processing device is further configured to assign a number of interrupt vectors to the PCIe physical function.

19. The system of claim 14, wherein the processing device is further configured to assign a number of interrupt vectors to the PCIe virtual function.

20. The system of claim 14, wherein the processing device is further configured to assign a command identifier to a command received by at least one PCIe virtual function among the first quantity of PCIe virtual functions, the second quantity of PCIe virtual functions, or both.

* * * * *